US012419203B2

(12) United States Patent
Walkley

(10) Patent No.: US 12,419,203 B2
(45) Date of Patent: Sep. 23, 2025

(54) UNIVERSAL TRACTOR IMPLEMENT

(71) Applicant: Jeff Walkley, Monkton, MD (US)

(72) Inventor: Jeff Walkley, Monkton, MD (US)

(\*) Notice: Subject to any disclaimer, the term of this patent is extended or adjusted under 35 U.S.C. 154(b) by 550 days.

(21) Appl. No.: 18/145,143

(22) Filed: Dec. 22, 2022

(65) Prior Publication Data
US 2023/0200275 A1   Jun. 29, 2023

Related U.S. Application Data

(60) Provisional application No. 63/292,813, filed on Dec. 22, 2021.

(51) Int. Cl.
*A01B 59/00* (2006.01)
*A01B 59/06* (2006.01)
*A01B 71/02* (2006.01)

(52) U.S. Cl.
CPC .......... *A01B 59/066* (2013.01); *A01B 59/062* (2013.01); *A01B 71/02* (2013.01); *A01B 59/004* (2013.01)

(58) Field of Classification Search
CPC ......... A01B 71/02; A01B 76/00; A01B 15/14; A01B 23/04; A01B 29/06; A01B 35/30; A01B 39/24; A01B 51/00; A01B 51/023; A01B 59/00; A01B 59/002; A01B 59/04; A01B 59/042; A01B 59/06; A01B 59/004; A01B 59/062; A01B 59/066
See application file for complete search history.

(56) References Cited

U.S. PATENT DOCUMENTS

| 2,910,307 | A |   | 10/1959 | Jennings, Jr. |            |
|-----------|---|---|---------|---------------|------------|
| 3,031,208 | A |   | 4/1962  | Abbott        |            |
| 4,378,052 | A | * | 3/1983  | Anderson      | A01B 59/04 |
|           |   |   |         |               | 172/449    |
| 4,393,942 | A | * | 7/1983  | Mijot         | A01B 63/1006 |
|           |   |   |         |               | 172/445    |

(Continued)

FOREIGN PATENT DOCUMENTS

| DE | 102017110653 B3 * | 8/2018 | ........... A01B 59/062 |
| EP | 2 361 496 | 8/2011 | |

(Continued)

OTHER PUBLICATIONS

International Search Report issued in co-pending Application No. PCT/US22/82210, dated Mar. 29, 2023.

*Primary Examiner* — Adam J Behrens
(74) *Attorney, Agent, or Firm* — Whiteford, Taylor & Preston, LLP; Peter J. Davis

(57) ABSTRACT

A universal tractor implement frame for attaching to the three point hitch or drawbar of a tractor including two longitudinal beams, two transverse struts arranged between and perpendicular to the two longitudinal beams, and two longitudinal stabilizers. Forward and Rear sets of frame legs are attached to the forward and rear struts, respectively and are configured to connect at their distal ends to the upper link of the tractor's three point hitch or drawbar. Connection plates are attached to the forward strut for connecting to the two lower links of the tractor's three point hitch or stabilizers. Various working tools may be attached to the beams, stabilizers, and/or to the struts of the universal frame for carrying out the work of prior art tractor implements.

2 Claims, 11 Drawing Sheets

(56) References Cited

U.S. PATENT DOCUMENTS

| | | | | |
|---|---|---|---|---|
| 5,064,338 | A * | 11/1991 | Lawrence | E02F 3/40 |
| | | | | 280/416.2 |
| 5,645,179 | A * | 7/1997 | Mohar | A01B 63/10 |
| | | | | 212/180 |
| 5,829,536 | A * | 11/1998 | Pigg | A01B 63/26 |
| | | | | 172/482 |
| 9,839,176 | B1 * | 12/2017 | Snyder | A01B 35/24 |
| 10,455,753 | B2 * | 10/2019 | Mollick | A01B 59/002 |
| 11,382,253 | B2 * | 7/2022 | Beaujot | A01B 63/002 |
| 12,207,590 | B2 * | 1/2025 | Dienst | A01B 59/043 |
| 2007/0000673 | A1 * | 1/2007 | Farnsworth | A01B 59/066 |
| | | | | 172/439 |
| 2008/0036178 | A1 * | 2/2008 | Slaubaugh | A01B 59/042 |
| | | | | 280/479.2 |

FOREIGN PATENT DOCUMENTS

| | | | | |
|---|---|---|---|---|
| EP | 3868190 A1 * | 8/2021 | | B62D 63/062 |
| WO | 2023/122712 | 6/2023 | | |

* cited by examiner

UNIVERSAL TRACTOR IMPLEMENT

BACKGROUND OF THE INVENTION

Field of the Invention

The present invention relates to farm, construction, and other working implements that attach to the three point hitch or the drawbar of a tractor.

Description of the Background

The three point hitch and drawbar are standard and common ways of attaching various working implements to a tractor. Dozens if not scores of different implements exist, each with a different working function. Examples of such implements include box blades, mower/cutters, grader blades, land planes, tillers, cultivators, disc harrows, aerators, rippers, seeders, and many others.

SUMMARY OF THE INVENTION

Each prior art tractor-drawn implement has its own functional structure as well as its own structure or frame for connecting to the tractor. Accordingly, a tractor owner who uses the tractor for many different types of work often owns (and has to store) numerous different implements, each with its own frame and attachment structure for the tractor. The present invention is a single universal implement frame which connects to a tractor's three point hitch or drawbar and which features a structure adapted to removably receive a wide range of different tools for different work functions. In this way, the tractor owner or user need only have a single universal implement frame which never (or rarely) needs to detach from the tractor. Rather, the universal implement frame can be converted from one type of job to another by adding or removing parts. In this way, the space necessary to store various tractor drawn implements can be reduced as much as 50%, since each tool no longer has a dedicated and integrated frame and attachment method. The present invention provides the additional advantage that the cost and weight of individual implements are significantly reduced.

Figure 1:
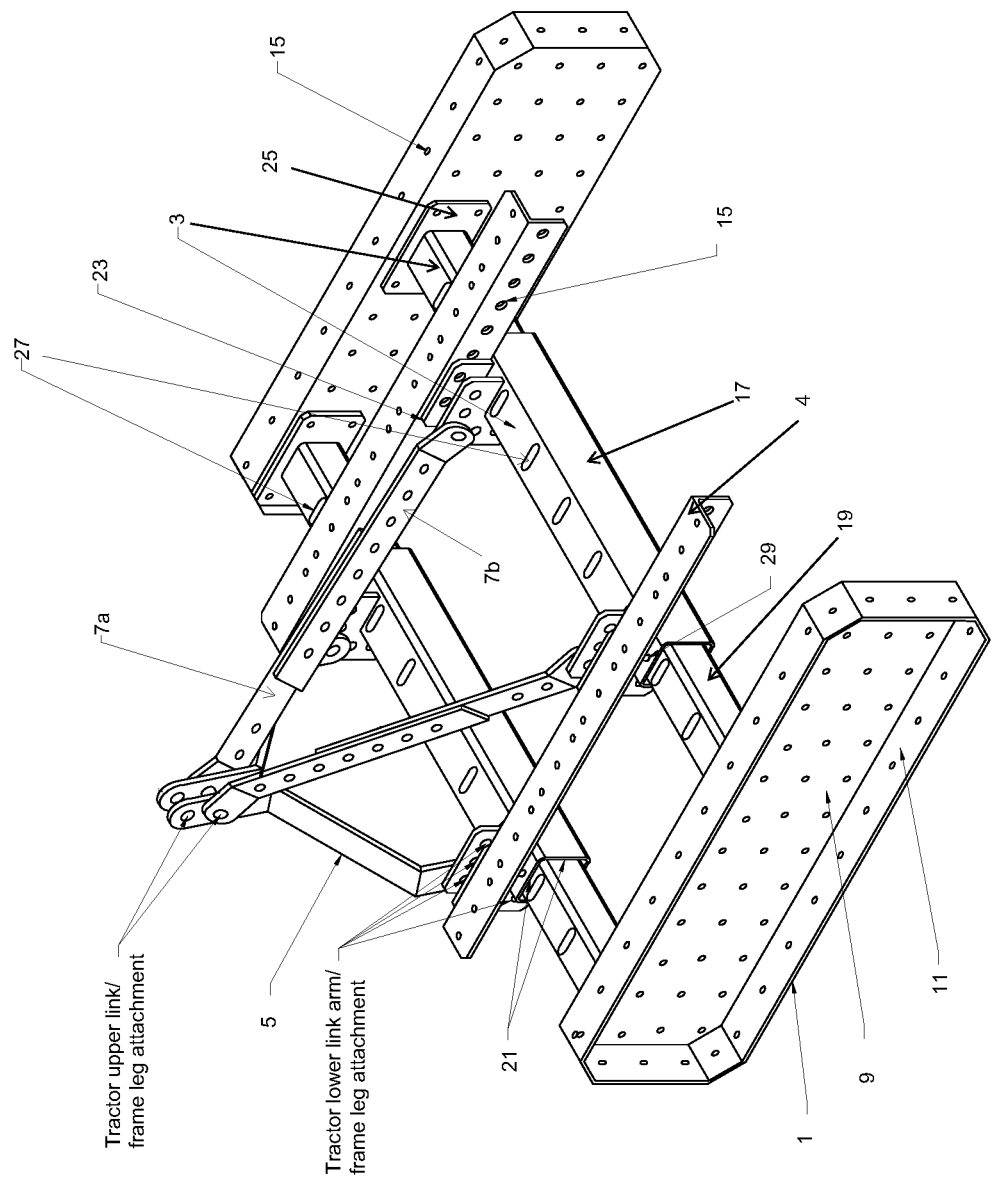
FIG. 1 is a perspective view of a universal implement frame according to an embodiment of the invention.
Figure 2:
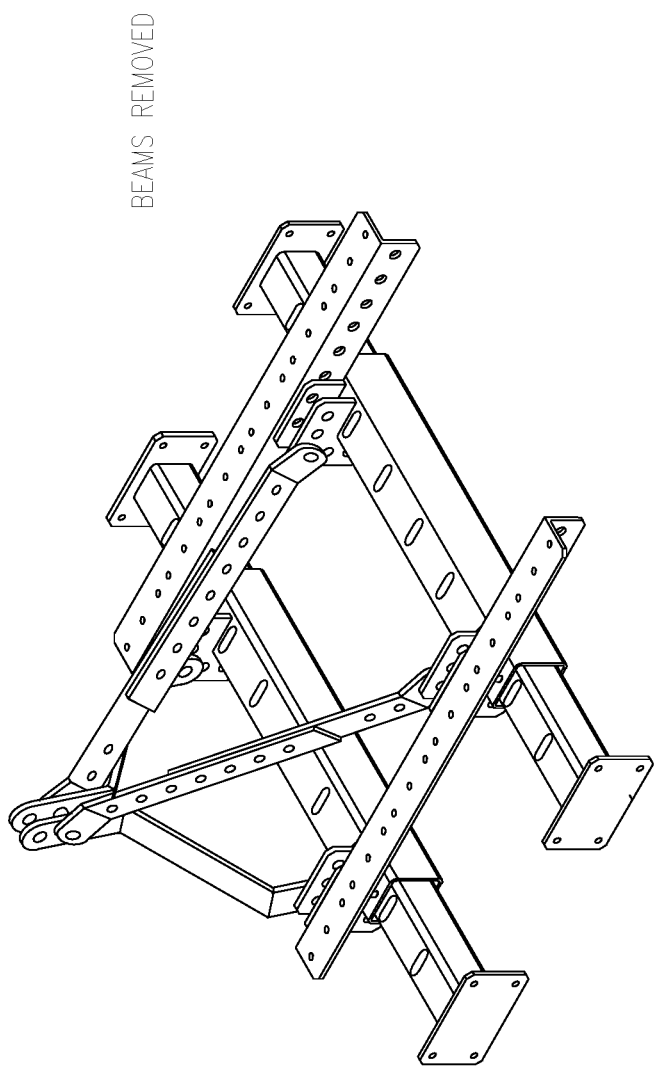
FIG. 2 is a perspective view of a universal frame according to an alternate embodiment of the invention.
Figure 3:
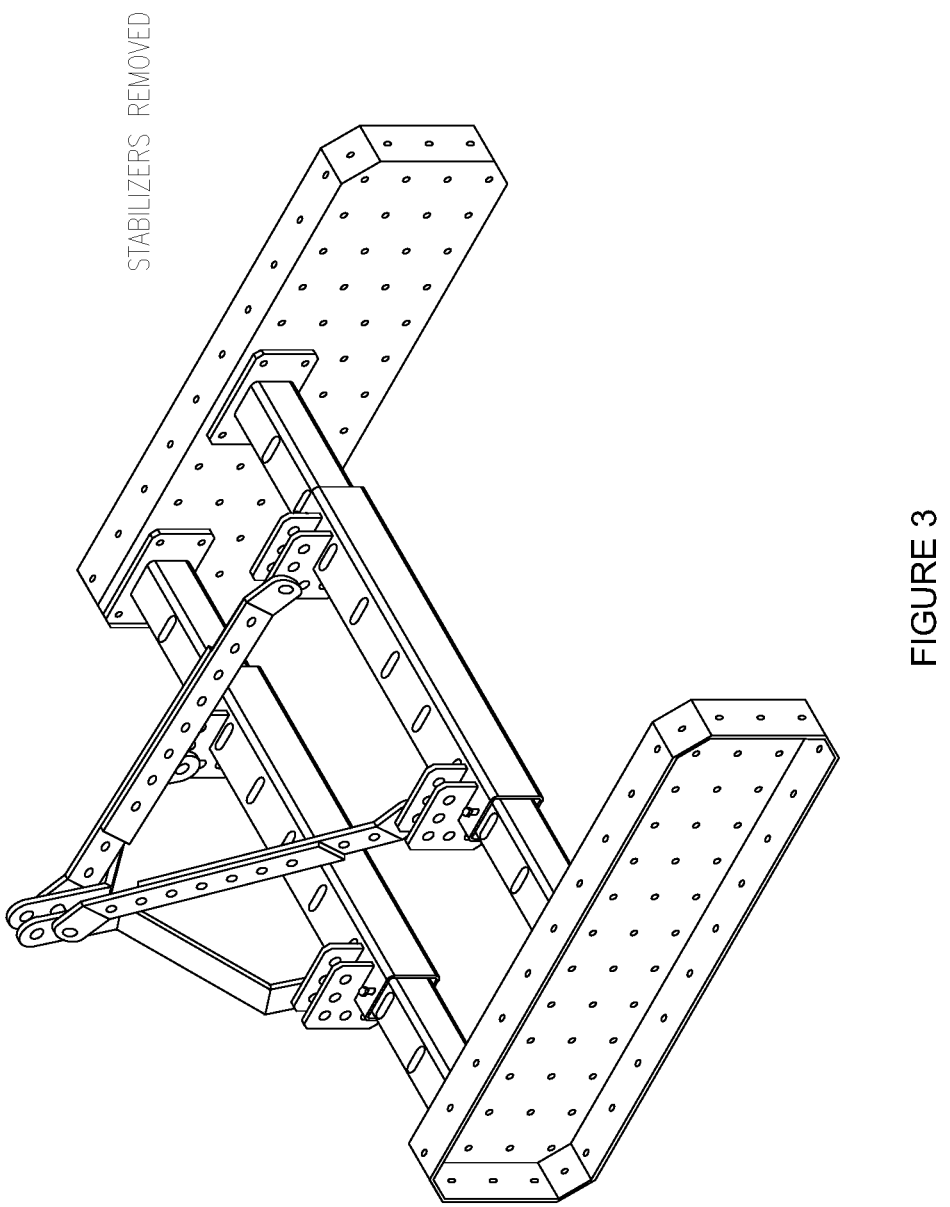
FIG. 3 is a perspective view of a universal frame according to another alternate embodiment of the invention.
Figure 4:
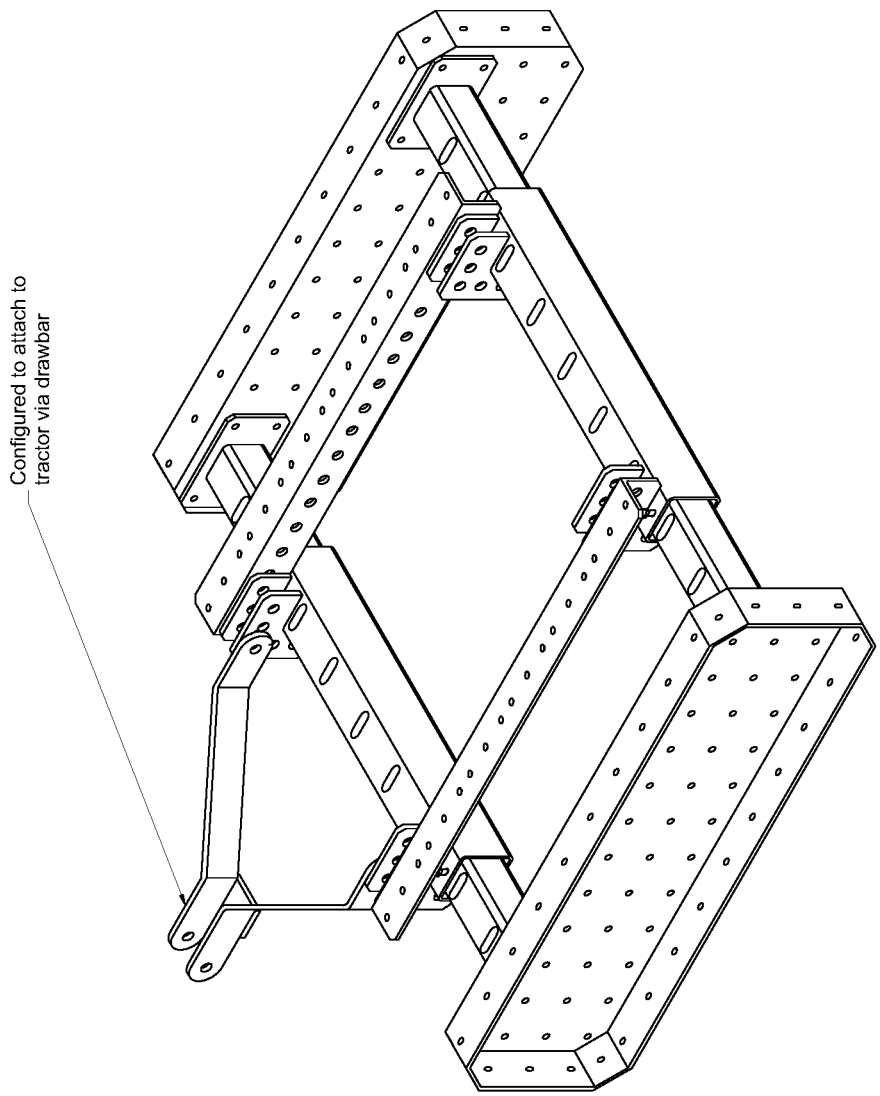
FIG. 4 is a perspective view of a universal frame according to yet another alternate embodiment of the invention.

Features in the attached drawings are numbered with the following reference numerals:

| | |
|---|---|
| 1 | Parallel beams |
| 3 | Telescoping struts |
| 4 | Stabilizers |
| 5 | Front Frame |
| 7a, 7b | Adjustable rear frame legs |
| 9 | Beam plate portion |
| 11 | Beam flange portion |
| 15 | Bolt holes |
| 17 | Larger hollow structural tube |
| 19 | Smaller hollow structural tube |
| 21 | Wear pads |
| 23 | Connection plates |
| 25 | End plates |
| 27 | Slotted holes |
| 29 | Clamping mechanism |

DETAILED DESCRIPTION

According to one object of the invention, there is provided a universal frame from which a broad range of 3-point hitch and drawbar attached implements can be created, used, and/or combined by attaching additional parts.

Referring to the figures, a preferred embodiment of the invention comprises two parallel beams 1, two telescoping struts 3 that are arranged between and perpendicular to the beams 1, and two parallel stabilizers 4 connected to the strut connection plates 23. The beams 1 are preferably arranged so that their longitudinal axes are parallel to the direction of travel. The beams and stabilizers need not be utilized simultaneously. The invention also includes a tractor three point hitch attachment assembly including a front frame 5 and two adjustable rear frame legs 7. The front frame can be used to attached to a tractor's drawbar in lieu of the three point hitch.

The beams 1 each have a plate portion 9 and a flange portion 11 along at least a partial perimeter of the plate portion 9. The plate portion 9 and flange portion 11 have patterned bolt holes 15 for attaching the struts 3 and for attaching additional equipment/parts that are independent of the frame.

The telescoping struts 3 may be any type of telescoping structure with fixable positions. The examples shown in the Figures are made of one larger and two smaller hollow structural shapes 17, 19 (HSS) that slide via wear pads 21. The larger HSS 17 may be fitted connection plates 23 with holes where the front frame 5, adjustable rear frame legs 7, and the tractor's 3-point hitch lower arms can connect. The smaller HSS 19 have end plates 25 for fastening to the beams' plate portions 9. There are slotted holes 27 on two opposing faces of the larger and smaller HSS members. Clamping mechanisms 29 on the struts secure their length once they are adjusted.

The stabilizers 4 are stiffening elements that connect to the struts and include hole patterns for fastening implements and for fastening to the struts at varying locations along their length. The examples shown in the figures are made of common structural angles.

The front frame 5 may be made of two longitudinal members having lower holes for fastening to the connection plates 23 on the struts 3, and upper holes for fastening the adjustable rear frame legs 7 and the top link of the tractor's 3-point hitch or to the tractor's drawbar.

The adjustable rear frame legs 7 may be constructed of longitudinal members 7a and 7b with hole patterns. The holes on the ends of the plates 7a and 7b are used to fasten to the front frame 5 and to the connection plates on one of the telescoping struts 3. The interior holes are for adjusting the overall length of the rear frame legs 7a and 7b, depending on where the telescoping struts 5 are attached to the beam plate portion 9.

Figure 5:
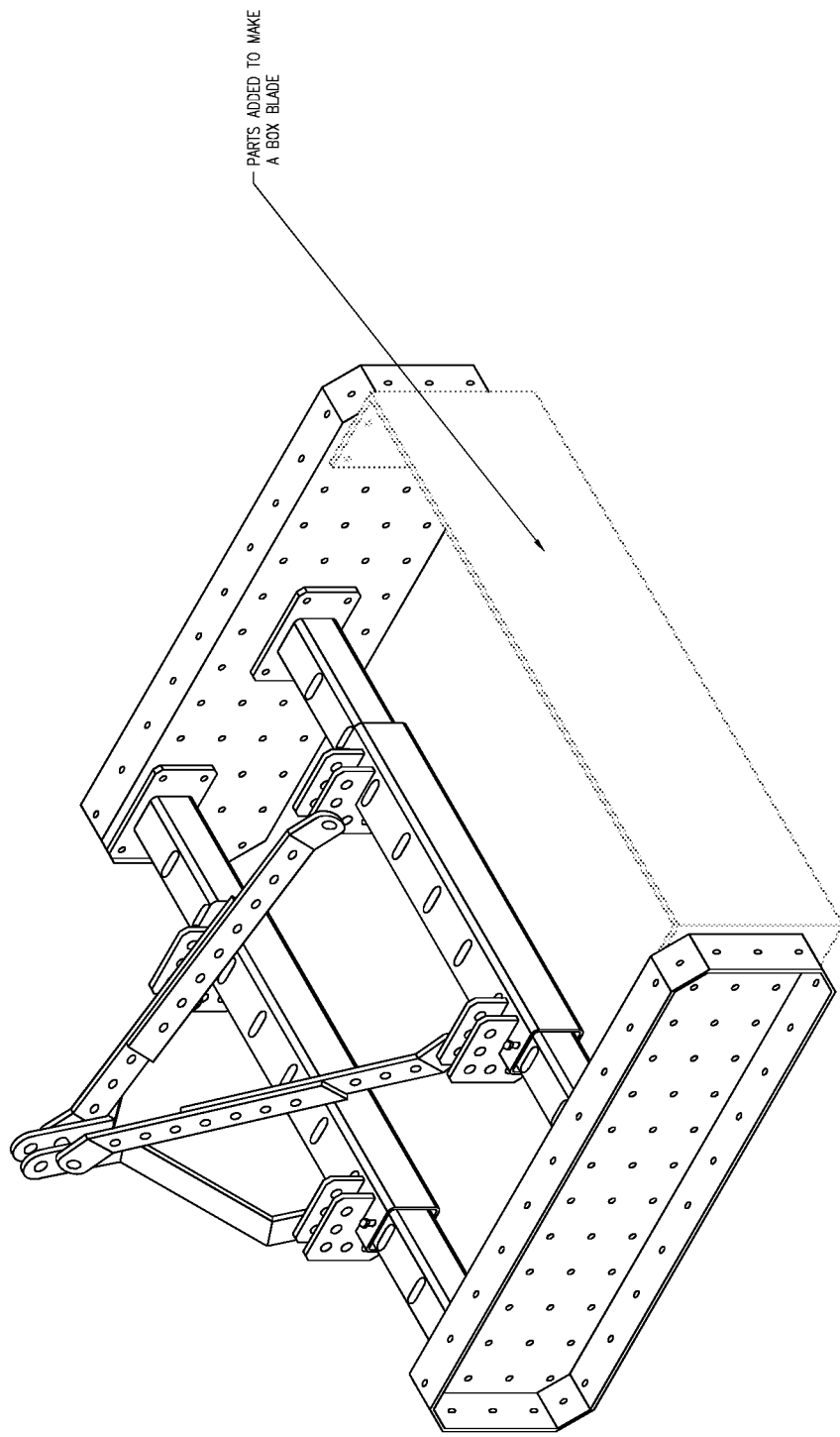
FIG. 5 is a perspective view of a universal implement frame according to an embodiment of the invention with a box blade tool attachment.
Figure 6:
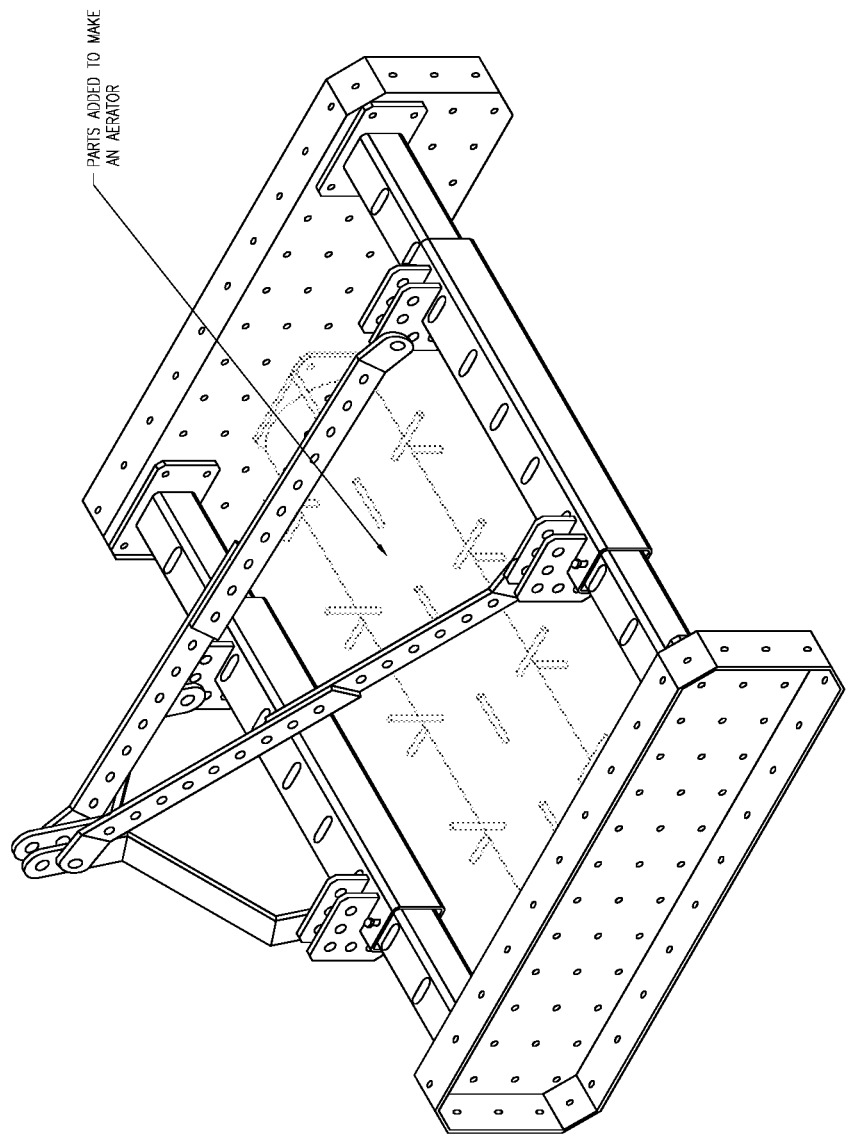
FIG. 6 is a perspective view of a universal implement frame according to an embodiment of the invention with an aerator tool attachment.
Figure 7:
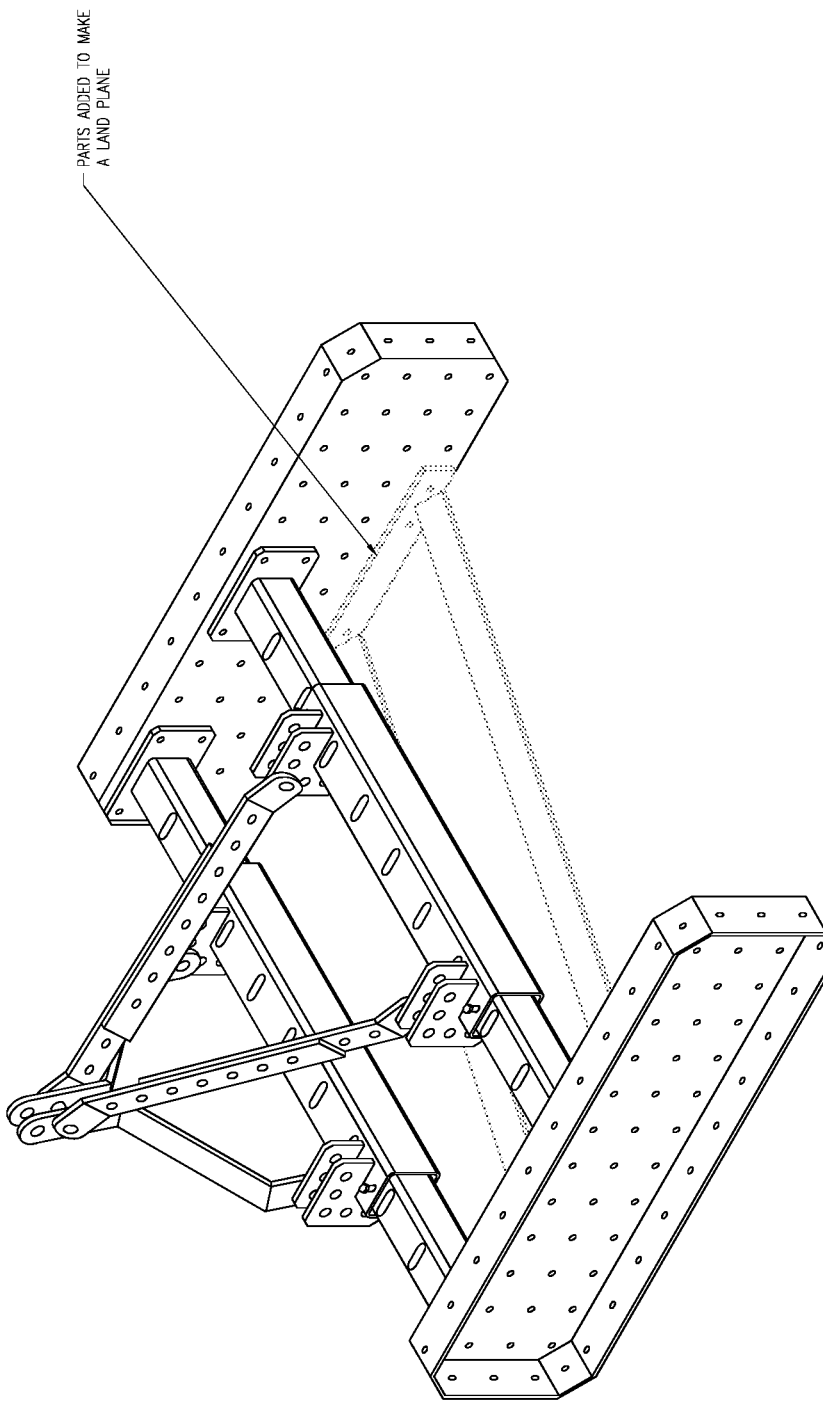
FIG. 7 is a perspective view of a universal implement frame according to an embodiment of the invention with a land plane attachment
Figure 8:
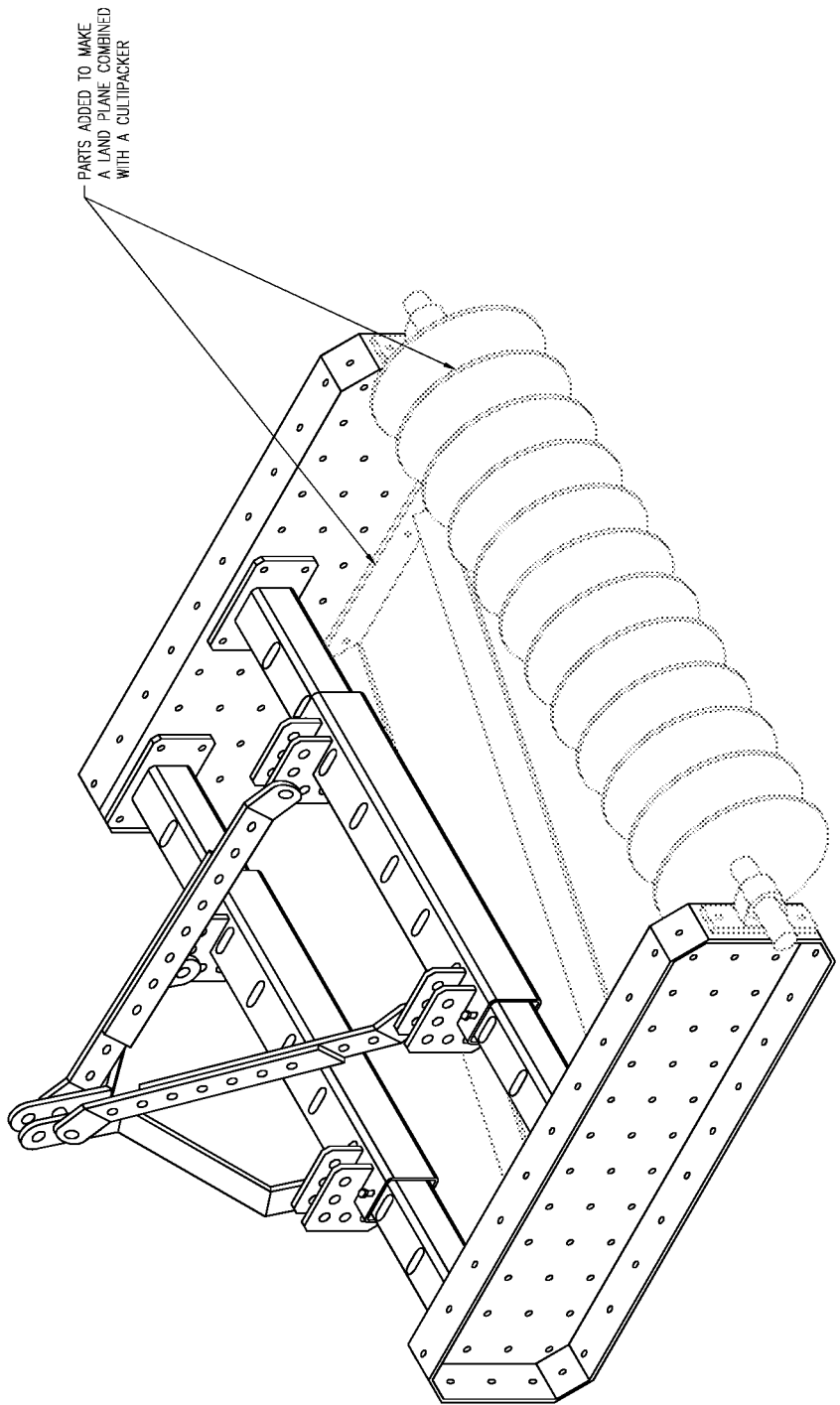
FIG. 8 is a perspective view of a universal implement frame according to an embodiment of the invention with both land plane and cultipacker attachments.
Figure 9:
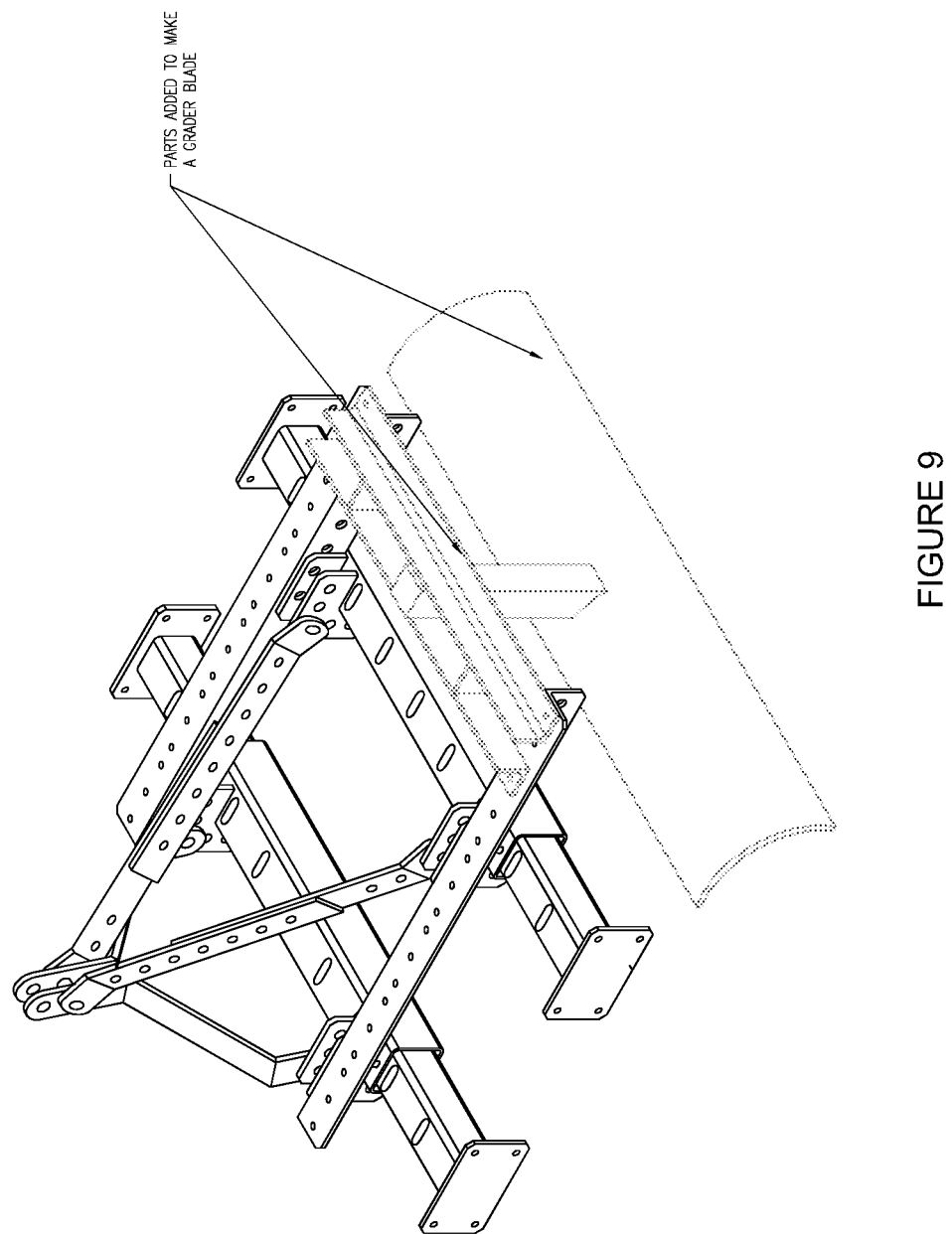
FIG. 9 is a perspective view of a universal implement frame according to an embodiment of the invention with a grader blade attachment.
Figure 10:
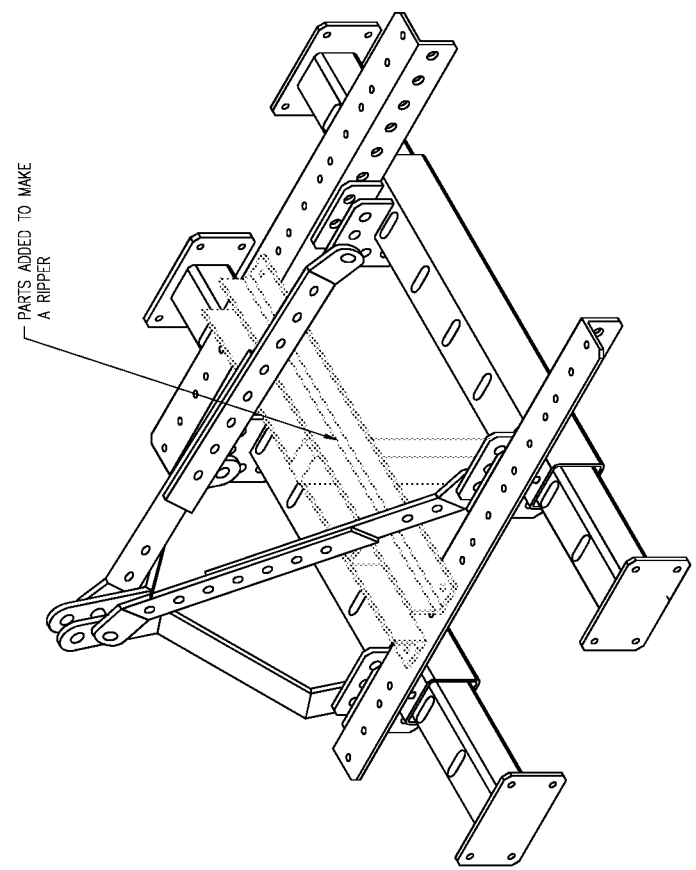
FIG. 10 is a perspective view of a universal implement frame according to an embodiment of the invention with a ripper attachment.
Figure 11:
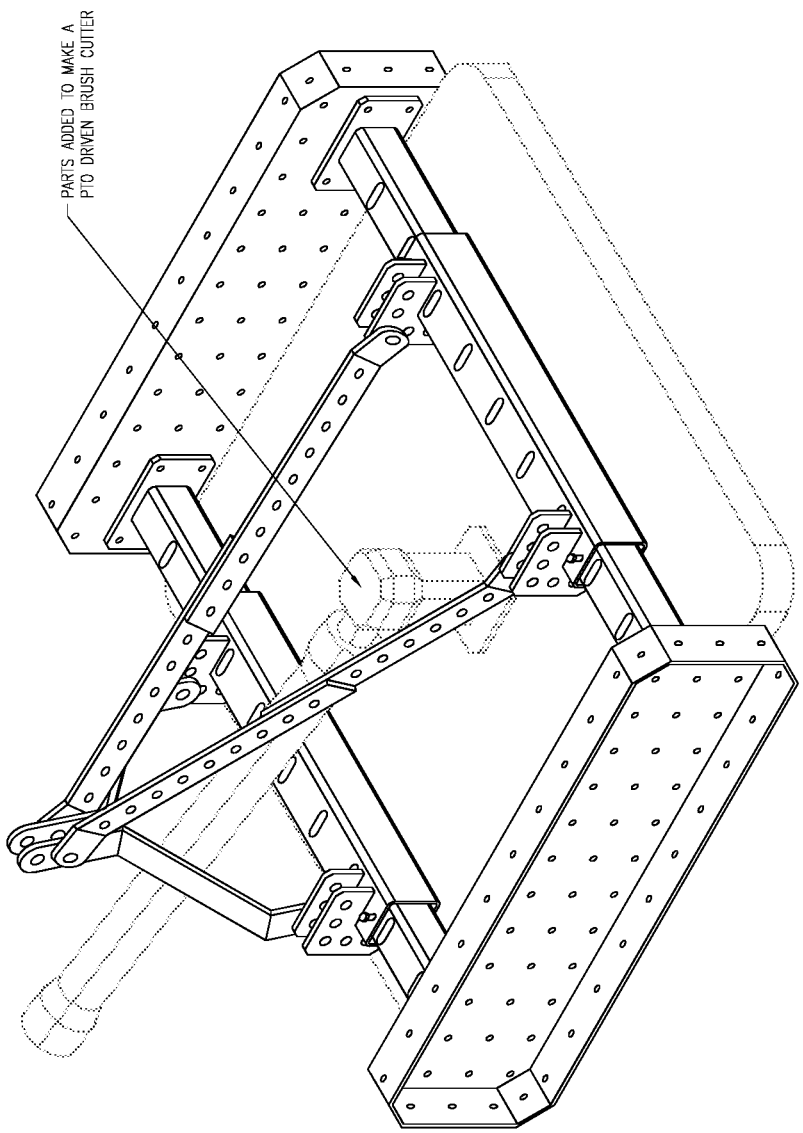
FIG. 11 is a perspective view of a universal implement frame according to an embodiment of the invention with a PTO-driven brush cutter attachment.

FIGS. 5-11 show how the universal frame of the invention may be used to support a variety of farm and construction implements simply by attaching one or more implements to the parallel beams, stabilizers, and/or the struts of the invention. Different size implements may be accommodated by adjusting the telescoping struts 3 inward or outward, placing the struts closer or further apart, and by placing the struts higher or lower on the beams.

The invention claimed is:

1. An implement frame configured for attachment to a three point tractor hitch or drawbar, the implement frame comprising:
    a. two beams arranged parallel to one-another, each defining a longitudinal axis parallel to a direction of travel, each said beam comprising a perforated plate bound on at least one edge by a perforated flange;
    b. at least two telescoping struts arranged between said two beams;
    c. a tractor hitch attachment assembly comprising
        i. a front frame attached at a bottom end to one of said at least two telescoping struts; and
        ii. two telescoping legs attached at bottom ends to a second of said at least two telescoping struts.

2. An implement frame according to claim 1, further comprising two stabilizers arranged parallel to one-another and connected to said telescoping struts.

* * * * *